(12) United States Patent
Kim et al.

(10) Patent No.: US 9,081,030 B2
(45) Date of Patent: Jul. 14, 2015

(54) COMPUTER-AIDED SIMULATION METHOD FOR ATOMIC-RESOLUTION SCANNING SEEBECK MICROSCOPE (SSM) IMAGES

(71) Applicant: Korea Advanced Institute of Science and Technology, Daejeon (KR)

(72) Inventors: Yong-Hyun Kim, Daejeon (KR); Ho-Ki Lyeo, Daejeon (KR); Eui-Sup Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/299,170

(22) Filed: Jun. 9, 2014

(65) Prior Publication Data

US 2014/0366229 A1 Dec. 11, 2014

(30) Foreign Application Priority Data

Jun. 10, 2013 (KR) .................. 10-2013-0066020
May 9, 2014 (KR) .................. 10-2014-0055617

(51) Int. Cl.
*G01Q 60/14* (2010.01)
*G01Q 60/10* (2010.01)
*G01Q 30/04* (2010.01)

(52) U.S. Cl.
CPC ............ *G01Q 60/14* (2013.01); *G01Q 30/04* (2013.01); *G01Q 60/10* (2013.01)

(58) Field of Classification Search
CPC ......... G01K 7/02; G01Q 30/04; G01Q 60/10; G01Q 60/14
See application file for complete search history.

(56) References Cited

U.S. PATENT DOCUMENTS

| | | | |
|---|---|---|---|
| 6,467,951 B1* | 10/2002 | Ghoshal | 374/45 |
| 2006/0151021 A1 | 7/2006 | Stark | |
| 2009/0014047 A1 | 1/2009 | Span | |
| 2012/0213250 A1* | 8/2012 | Snyder | 374/179 |
| 2013/0044788 A1* | 2/2013 | Snyder | 374/179 |

FOREIGN PATENT DOCUMENTS

EP    1326292 A1    7/2003

OTHER PUBLICATIONS

Bian et al., "Three-dimensional modeling of nanoscale Seebeck measurements by scanning thermoelectric microscopy", Applied Physics Letters 87, 053115, 2005.*
Huzel, D., et al., Characterization and Application of Thermoelectric Nanowires, Nanowires-Implementations and Applications, Dr. Abbass Hashim (Ed.), ISBN: 978-953-307-318-7, InTech, Available from: http://www.intechopen.com/books/nanowires-implementations-and-applications/characterization-and-application-of-thermo-electric-nanowires, Germany, pp. 289-317, Jul. 18, 2011 (30 pages).
Korean Patent Office, International Search Report, International Patent Application No. PCT/KR2014/005043, issued Sep. 15, 2014 (3 pages).

* cited by examiner

*Primary Examiner* — Michael Logie
(74) *Attorney, Agent, or Firm* — Wood, Herron & Evans, LLP

(57) ABSTRACT

A computer-aided simulation method for an atomic-resolution scanning Seebeck microscope (SSM) image is provided. In the computer-aided simulation method, a computer may calculate a local thermoelectric voltage for a position of a voltage probe, to acquire an SSM image corresponding to the position.

8 Claims, 43 Drawing Sheets

COMPUTER-AIDED SIMULATION METHOD FOR ATOMIC-RESOLUTION SCANNING SEEBECK MICROSCOPE (SSM) IMAGES

CROSS-REFERENCE TO RELATED APPLICATIONS

The present application claims the benefit of Korean Patent Application No. 10-2013-0066020 and of Korean Patent Application No. 10-2014-0055617, respectively filed on Jun. 10, 2013 and May 9, 2014, in the Korean Intellectual Property Office, the disclosures of which are hereby incorporated herein by reference in their entireties.

FIELD OF THE INVENTION

The present invention relates to a computer-aided simulation method for an atomic-resolution scanning thermoelectric microscope.

BACKGROUND OF THE INVENTION

To observe a surface of a material in an atomic resolution, a scanning tunneling microscope (STM) technology disclosed in U.S. Pat. No. 4,343,993 may be used. The STM technology may be used to display an atomic-resolution image representing a surface of a material, based on a vacuum tunneling current localized by applying an external voltage to a gap between the material and a probe. However, in the STM technology, since the external voltage needs to be applied, Fermi electrons may be likely to be disturbed by the external voltage, and a narrow region may be scanned. Additionally, a sharp probe is required to generate a localized current, however, a yield may not be high due to a difficulty of forming a sharp probe.

To avoid the above disadvantages of the STM technology, a scanning thermoelectric microscope may be used instead of an STM. However, since it is generally known that it is difficult to localize heat in space, it may be difficult to actually implement the scanning thermoelectric microscope.

Recently, a technology of observing a surface of a material at an atomic resolution using a scanning thermoelectric microscope has been disclosed in "Thermoelectric imaging of structural disorder in epitaxial graphene" prepared by S. Cho, et al. and published in 2013 in arXiv: 1305.2845 (http://arxiv.org/abs/1305.2845) and Nature Mater. 12, 913.

Accordingly, it is desired to acquire an atomic-resolution image from a surface of a material, using a scanning thermoelectric microscope that is an actual apparatus, and to simulate a form of the surface using a computer to determine an atomic structure corresponding to the acquired atomic-resolution image.

SUMMARY OF THE INVENTION

An aspect of the present invention provides a computer-aided simulation method for an atomic-resolution scanning Seebeck microscope (SSM) image, to provide a method of simulating a form of a surface of a material corresponding to an image acquired by an actual scanning thermoelectric microscope and of recognizing the form.

According to an aspect of the present invention, there is provided a computer-aided simulation method for an atomic-resolution SSM image, wherein a computer calculates a local thermoelectric voltage V(r) for a position of a voltage probe, to acquire an SSM image corresponding to the position, using the following equation:

$$V(r) = V_{diff} + S_{coh}(r) \int \nabla T(r; r') \cdot \frac{r' - r}{|r' - r|^3} d^3 r'$$

In the equation, $V_{diff}$ denotes a thermoelectric voltage drop in a diffusive transport region in a tip and a sample, $S_{coh}(r)$ denotes a position-dependent Seebeck coefficient, r denotes a distance measured from a point voltage probe, r' denotes material internal coordinates, $\nabla T(r;r')$ denotes a temperature gradient radially weighted by a factor of $1/r^2$, and $$\int \nabla T(r; r') \cdot \frac{r' - r}{|r' - r|^3} d^3 r'$$

denotes a volume integral of a temperature profile.

The volume integral $$\int \nabla T(r; r') \cdot \frac{r' - r}{|r' - r|^3} d^3 r'$$

may be defined by the following equation:

$$\int \nabla T(r; r') \cdot \frac{r' - r}{|r' - r|^3} d^3 r' \equiv \Delta T_{coh}(r)$$

In the equation, $\Delta T_{coh}(r)$ denotes an effective temperature drop at an interface between the tip and the sample.

The position-dependent Seebeck coefficient $S_{coh}(r)$ may be calculated from the Landauer formula by the following equation:

$$S_{coh}(r) = -\frac{1}{eT} \frac{\int \tau^{el}(E, r)(E - E_F)\left(-\frac{\partial f}{\partial E}\right) dE}{\int \tau^{el}(E, r)\left(-\frac{\partial f}{\partial E}\right) dE}$$

In the equation, e denotes an electron charge, T denotes an absolute temperature, $\tau^{el}$ denotes an electron transmission probability, $E_F$ denotes a Fermi energy, and $f$ denotes a Fermi-Dirac distribution function at the absolute temperature T.

The position-dependent Seebeck coefficient $S_{coh}(r)$ may be derived to the following equation:

$$S_{coh}(r) = S^{tip} + S^{sample}(r)$$

In the equation, $S^{tip}$ denotes a tip Seebeck coefficient, and $S^{sample}(r)$ denotes a sample Seebeck coefficient of a material.

The sample Seebeck coefficient $S^{sample}(r)$ may be defined by the following equation:

$$S^{sample}(r) = -\frac{1}{eT} \frac{\int N_e^{sample}(E, r)(E - E_F)\left(-\frac{df}{dE}\right) dE}{\int N_e^{sample}(E, r)\left(-\frac{\partial f}{\partial E}\right) dE}$$

In the equation, e denotes an electron charge, T denotes an absolute temperature, $E_F$ denotes a Fermi energy, $f$ denotes a Fermi-Dirac distribution function at the absolute temperature T, and $N_e^{sample}(E,r)$ denotes a local density of states (DOS) obtained from first-principles calculations for a material surface.

The effective temperature drop $\Delta T_{coh}(r)$ may be calculated by the Following equation:

$$\Delta T_{coh}(r) = \frac{\Delta Q 3h}{\pi^2 k_B^2 T} \frac{1}{\tau^{ph}(r)}$$

In the equation, $k_B$ denotes a Boltzmann constant, $\tau^{ph}(r)$ and denotes a phonon transmission probability of a tip-sample junction.

The effective temperature drop $\Delta T_{coh}(r)$ may be deduced by the following equation:

$$\Delta T_{coh}(r) = \frac{V^{exp}(r) - V_{diff}}{S_{coh}^{theory}(r)}$$

In the equation, $V^{expt}(r)$ denotes an experimental thermoelectric voltage measured in a defect-free region, and $S_{coh}^{theory}(r)$ denotes a theoretical Seebeck coefficient of a material.

The effective temperature drop $\Delta T_{coh}(r)$ may be deduced by a function represented by the following equation:

$$\Delta T_{coh}(r) = f(E^{vdw}(r))$$

In the equation, $f(E^{vdw}(r))$ denotes a function including a linear fitting formula or an exponential function, and $E^{vdw}(r)$ denotes a van der Waals (vdW) energy. The function may be based on a correlation between the effective temperature drop $\Delta T_{coh}(r)$ and the vdW energy $E^{vdw}(r)$.

EFFECT

According to embodiments of the present invention, a computer may simulate an atomic-resolution image of a scanning Seebeck microscope (SSM) corresponding to a surface of a material based on a Seebeck effect.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE INVENTION

Figure 1:
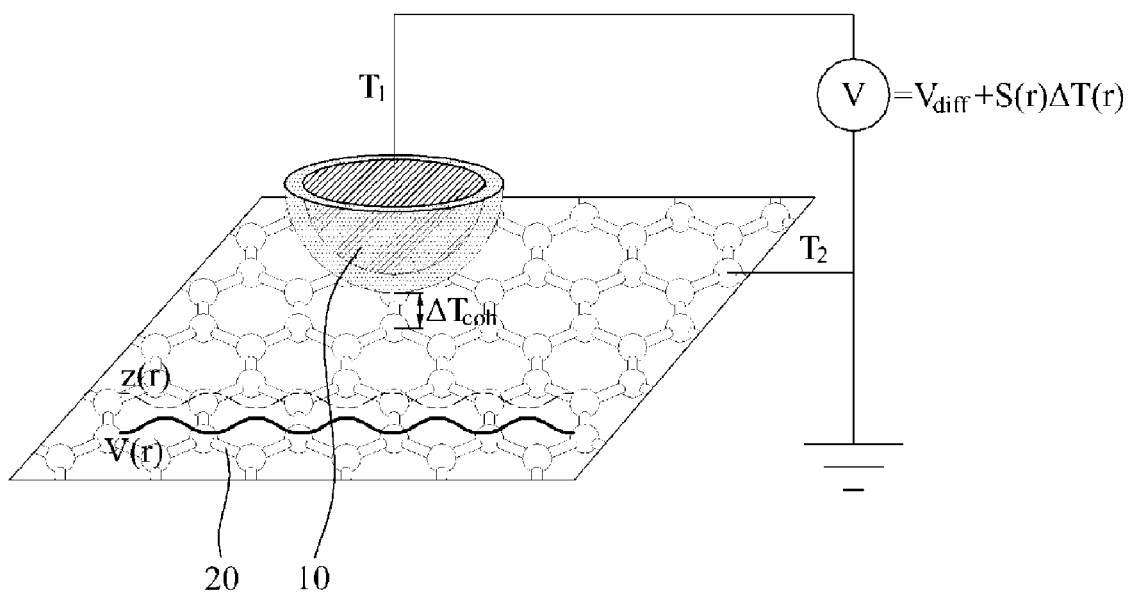
FIG. 1 schematically illustrates an atomic resolution of a scanning thermoelectric microscope according to an embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, in the present disclosure, a scanning Seebeck microscope (SSM) may refer to a scanning thermoelectric microscope based on a Seebeck effect. According to an embodiment, a computer-aided simulation may be performed on a material surface, to search for a material corresponding to an image of the material surface acquired by the SSM.

A scanning tunneling microscope (STM) may use tunneling, and may be used to acquire a direct wave function image based on a charge-transfer gap and a voltage bias. Unlike the STM, an SSM based on the Seebeck effect may be used to acquire a differential wave function image based on a heat-transfer gap and a temperature bias.

Additionally, in the present disclosure, an SSM image may refer to an image acquired by the above-described SSM. Hereinafter, an operation of simulating an atomic-resolution image of a material surface corresponding to an SSM image, using a computer will be further described.

Hereinafter, a simulation of an SSM image will be described based on graphene, however, a material is not limited to graphene. Accordingly, a simulation method according to embodiments may be applicable to other materials having a predetermined atomic structure.

In the present disclosure, a Seebeck coefficient may include, for example, a position-dependent Seebeck coefficient or a coherent Seebeck coefficient $S_{coh}(r)$, and a local Seebeck coefficient $S(r)$ or $S(r;r')$.

Heat may be perceived to be diffusive and transported incoherently by charge carriers (for example, electrons and holes) and lattice vibrations (for example, phonons) in a material. Accordingly, it may be very difficult to perform local imaging of a material and electronic states of the material through heat transport. Recently, however, Cho et al. reported that a series of atomic wave function images are obtained by performing local thermoelectric imaging on a surface of epitaxial graphene using a heat-based scanning probe microscope. The above report may generate a question on how to measure an atomic variation in a unit cell in a heat transport experiment. To answer the question, fundamental physics of thermoelectricity or the Seebeck effect may need to be re-evaluated from typical length scales to atomic length scales, in addition to elucidating an imaging mechanism of a scanning thermoelectric microscope.

The present disclosure may provide a theory of a scanning thermoelectric microscope with an atomic resolution based on mesoscopic electrons and heat transport characteristics. The theory, beginning with a macroscopic general transport equation and an electrostatic equation, may show feasibility and mechanisms of an atomic scale imaging technology with thermoelectric measurements. Computer simulations of a thermoelectric image may be combined with experimental results, and may be effectively used to identify atomic scale defects in graphene.

FIG. 1 schematically illustrates an atomic resolution of a scanning thermoelectric microscope according to an embodiment.

As shown in FIG. 1, a probe 10 of a scanning thermoelectric microscope at a first temperature $T_1$ may be in contact with graphene 20 at a second temperature $T_2$. Measurement may be performed through a modified ultrahigh vacuum contact mode atomic force microscope (AFM). For convenience, in the present disclosure, graphene is described, however, a simulation method according to an embodiment of the present invention may not be interpreted to be limited to graphene. A temperature gradient $\nabla T$ may be formed in the vicinity of a tip-sample contact area by a difference between the first temperature $T_1$ and the second temperature $T_2$, and an effective temperature drop $\Delta T_{coh}(r)$ may be induced in an interface between a tip and a sample. Accordingly, a thermoelectric voltage showing a phase difference of 180° with an atomic corrugation $z(r)$ may be accurately measured by a high-impedance voltmeter in an actual scanning thermoelectric microscope. A measured local thermoelectric voltage may be expressed as shown in Equation 1 below.

$$V(r) = V_{diff} S_{coh}(r) \Delta T_{coh}(r) \quad \text{[Equation 1]}$$

In Equation 1, $V_{diff}$ denotes a thermoelectric voltage drop in a diffusive transport region in both the tip and the sample, $S_{coh}(r)$ and $\Delta T_{coh}(r)$ denote a position-dependent Seebeck coefficient and an effective temperature drop at the interface between the tip and sample, respectively. Electrons and heat may be coherently transported. A coherent thermoelectric voltage $V(r)$, represented by Equation 1, may correspond to an atomic resolution observed in a scanning thermoelectric microscope, which will be described below.

When the temperature gradient $\nabla T$ exists in a macroscopic electro-conductive system, electrons or charged particles may be transported based on an electrostatic field E and a driving force for particle diffusion under the temperature gradient $\nabla T$. An electric current density $J(r)$ at a local site may be expressed by a general transport equation $J(r)=\sigma[E(r)-S(r)\nabla T(r)]$ in which $\sigma$ denotes an electrical conductivity, and $S(r)$ denotes a local Seebeck coefficient or thermopower. For example, an ideal voltmeter may satisfy an open-circuit limit, that is, $J(r)=0$ and accordingly, charged particles may experience a balance between an electrostatic force and a thermopower force. A built-in potential may be expressed as shown in Equation 2 below.

$$E(r) = S(r) \nabla T(r) \quad \text{[Equation 2]}$$

A temperature profile $T(r)$ may be primarily determined by thermal transport properties of a system, for example, thermal conductivities of constituent materials and interfacial thermal conductivity between the materials. Equation 2 may be derived for macroscopic diffusive systems, however, there is no limitation thereto. Accordingly, Equation 2 may also be applied to microscopic systems. When an external electric field is not applied, E(r) may indicate only a built-in electric field resulting from a thermal diffusion-induced charge distribution $q^{th}(r)$. A Gauss's law may be applied to the built-in electric field and a charge density, that is, $\nabla \cdot E(r) = q^{th}(r)$. Accordingly, Equation 2 may lead to Equation 3 shown below.

$$\nabla \cdot (S(r) \nabla T(r)) = q^{th}(r) \quad \text{[Equation 3]}$$

From Equation 3, the thermal diffusion-induced charge distribution $q^{th}(r)$ may be accurately traced back from information of the local Seebeck coefficient $S(r)$ and temperature profile $T(r)$.

When an AFM tip is assumed to be a point probe as shown in FIG. 1, a local thermoelectric voltage may be equivalent to the "Hartree-type" electrostatic potential $V(r) = \int q^{th}(r;r')/|r'-r| d^3r'$ in which r denotes a position of a probe and V(r) denotes integration over r' for the entire volume. Based on Equation 3, and $\nabla T$ having a value of "0" at infinity, the local thermoelectric voltage may be expressed as shown in Equation 4 below.

$$V(r) = \int S(r; r') \nabla T(r; r') \cdot \frac{r' - r}{|r' - r|^3} d^3 r' \quad \text{[Equation 4]}$$

The local thermoelectric voltage V(r) may be expressed in the form of a volume integral, not a line integral, of the local Seebeck coefficient S(r) convoluted by a radially weighted temperature gradient $\nabla T(r)$ by a factor of $1/r^2$ in which r denotes a distance measured from a point voltage probe. Because Equation 4 is an exact expression that does not involve an approximation, Equation 4 may be generally applicable for other thermoelectric systems including non-contact STM setups.

The volume integral in Equation 4 may be split into a diffusive transport region and a coherent transport region. In the diffusive transport region, a Seebeck coefficient and a temperature profile may be determined only by material properties, for example, an electrical conductivity and a thermal conductivity. From a Mott formula, a diffusive Seebeck coefficient may be represented by $$S = -\frac{(k_B \pi)^2 T}{3e} \frac{\partial}{\partial E} (\ln[\sigma(E)])_{E_F}$$

in which $k_B$ denotes a Boltzmann constant, T denotes an absolute temperature, e denotes an electron charge, $\sigma(E)$ denotes an energy-dependent electrical conductivity, and $E_F$ denotes a Fermi energy. Because a temperature profile $T(r)$ may mostly vary slowly, under control of a phonon mean-free-path, an almost constant thermoelectric voltage $V_{diff}$ may be generated in the diffusive transport region.

In the coherent transport region at a tip-sample interface, transport of electrons and phonons across a junction may be accounted for by each transmission probability and electrical and thermal conductance quanta. A coherent Seebeck coefficient $S_{coh}(r)$ may be dependent on a tip position r that is independent of internal coordinates r', and may be expressed based on an electron transmission probability τ(E,r) of a tip-sample junction as $$S_{coh}(r) = -\frac{(k_B\pi)^2 T}{3e}\frac{\partial}{\partial E}(\ln[\tau(E,r)])_{E_F}$$

from a Landauer formula.

A local coherent thermoelectric voltage may be expressed as shown in Equation 5 below.

$$V_{coh}(r) = S_{coh}(r)\int \nabla T(r;r')\cdot\frac{r'-r}{|r'-r|^3}d^3r' \quad \text{[Equation 5]}$$
$$= S_{coh}(r)\Delta T_{coh}(r).$$

In Equation 5, a volume integral of a weighted temperature profile may be set to an effective temperature drop $\Delta T_{coh}(r)$ that is sensitively dependent on a local geometry and a near-probe temperature profile due to $1/r^2$. Physically, the effective temperature drop $\Delta T_{coh}(r)$ may correspond to an interfacial temperature drop that is known to exist at a thermal boundary between two different thin-film materials. Generally, an interfacial temperature drop at thin films may be determined based on vibrational spectra and interaction strength of involved materials.

For example, the effective temperature drop $\Delta T_{coh}(r)$ may be expressed as $$\Delta T_{coh}(r) = \frac{\Delta Q 3h}{\pi^2 k_B^2 T}\frac{1}{\tau^{ph}(r)}$$

from the Landauer formula, based on a phonon transmission probability of the tip-sample junction. The phonon transmission probability of the tip-sample junction may be represented by $\tau^{ph}(r)$.

Based on the diffusive thermoelectric voltage $V_{diff}$ and the coherent thermoelectric voltage $V_{coh}(r)$, a total local thermoelectric voltage may be derived from Equation 1. Accordingly, how thermopower profiling works for a p-n junction, and how local thermoelectric imaging works seamlessly from micrometer to sub-angstrom scales may be explained.

The coherent Seebeck coefficient $S_{coh}(r)$, for example, a position-dependent Seebeck coefficient may be expressed as shown in Equation 6 below.

$$S_{coh}(r) = -\frac{1}{eT}\frac{\int \tau^{el}(E,r)(E-E_F)\left(-\frac{\partial f}{\partial E}\right)dE}{\int \tau^{el}(E,r)\left(-\frac{\partial f}{\partial E}\right)dE} \quad \text{[Equation 6]}$$

In a weak-coupling limit, the electron transmission probability τ(E,r) may be approximated as $\tau(E,r) \propto N_e^{tip}(E) N_e^{sample}(E,r)$ in which $N_e(E,r)$ denotes a local density of states (DOS).

From the Landauer formula, the coherent Seebeck coefficient $S_{coh}(r)$ may be expressed as $S_{coh}(r)=S^{tip}+S^{sample}(r)$. A sample Seebeck coefficient $S^{sample}(r)$ may be expressed as shown in Equation 7 below.

$$S^{sample}(r) = -\frac{1}{eT}\frac{\int N_e^{sample}(E,r)(E-E_F)\left(-\frac{\partial f}{\partial E}\right)dE}{\int N_e^{sample}(E,r)\left(-\frac{\partial f}{\partial E}\right)dE} \quad \text{[Equation 7]}$$

In Equation 7, $f$ denotes a Fermi-Dirac distribution function at an absolute temperature T. For example, at 300 kelvin (K), $(-\partial f/\partial E)$ may act as an integration window of ~0.1 electronvolt (eV) near the Fermi energy $E_F$. The sample Seebeck coefficient $S^{sample}(r)$ may be either positive or negative depending on asymmetry or energy derivative of the local DOS $N_e^{sample}(E,r)$ at the Fermi energy $E_F$.

Because the local DOS $N_e^{sample}(E,r)$ may be obtained from first-principles calculations for a material surface, Equation 1 may serve as a foundation of a thermoelectric image simulation when the effective temperature drop $\Delta T_{coh}(r)$ is known at the tip-sample junction. Generally, information of the effective temperature drop $\Delta T_{coh}(r)$ may not be known either from an experiment or simulation. Instead, the effective temperature drop $\Delta T_{coh}(r)$ may be deduced by inverting Equation 1 with an experimental thermoelectric voltage $V^{expt}(r)$ and a theoretical Seebeck coefficient $S_{coh}^{theory}(r)$, for example the sample Seebeck coefficient $S^{sample}(r)$, as shown in FIGS. 2A through 2F.

FIGS. 2A through 2F illustrate an experimental thermoelectric voltage image for a defect-free region, a Seebeck coefficient image, line profiles, and a correlation between an effective temperature drop $\Delta T_{coh}(r)$ and van der Waals (vdW) energy $E^{vdw}(r)$ according to an embodiment.

Figure 2A:
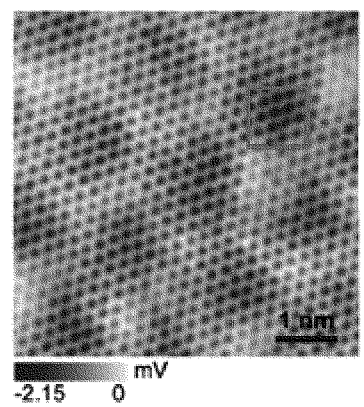
FIGS. 2A through 2F illustrate an experimental thermoelectric voltage image and a Seebeck coefficient image for a defect-free region of n-doped free-standing graphene, line profiles, and a correlation between an effective temperature drop and van der Waals (vdW) energy according to an embodiment.

FIG. 2A illustrates an experimental thermoelectric voltage image for a defect-free region in bilayer graphene on Silicon carbide(0001) (SiC(0001)). In FIG. 2A, a pattern originated from 6√3×6√3R30° of graphene reconstructed by a SiC substrate may be observed.

Figure 2B:
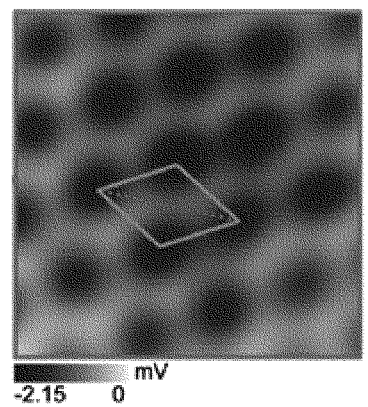

FIG. 2B illustrates an enlarged area of the experimental thermoelectric voltage image of FIG. 2A. Experimental thermoelectric voltages may be sampled in a graphene unit cell, marked with a parallelogram.

Figure 2C:
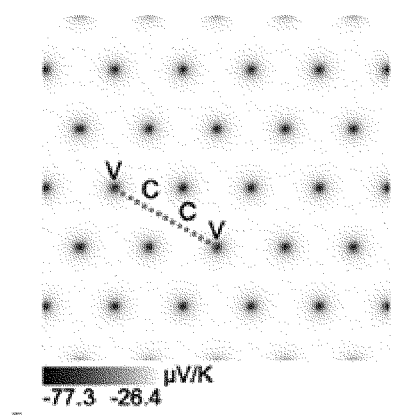

FIG. 2C illustrates a computer-simulated Seebeck coefficient image of n-doped free-standing graphene. In FIG. 2C, a center void and a carbon atom may be marked with "V" and "C," respectively.

Figure 2D:
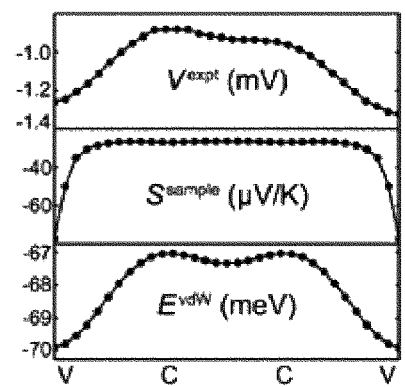

FIG. 2D illustrates line profiles of an experimental thermoelectric voltage, a Seebeck coefficient, and vdW energy, along a line of V-C-C-V in FIG. 2C.

Figure 2E:
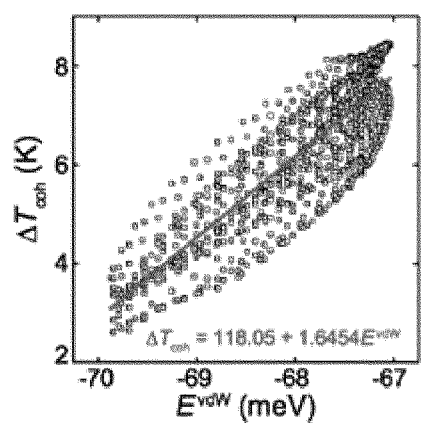

FIG. 2E illustrates a correlation between a deduced effective temperature drop $\Delta T_{coh}(r)$ and the vdW energy $E^{vdw}(r)$. Referring to FIGS. 8A through 8D, a locally averaged sample Seebeck coefficient $S^{sample}(r)$ with a disk radius of 0.5 angstrom (Å) may be used to deduce the effective temperature drop $\Delta T_{coh}(r)$. For example, the correlation between the deduced effective temperature drop $\Delta T_{coh}(r)$ and the vdW energy $E^{vdw}(r)$ may be represented by $\Delta T_{coh}(r)=f(E^{vdw}(r))$. A function $f(E^{vdw}(r))$ may include a linear fitting formula or an exponential function. In FIG. 2E, a linear fitting formula $\Delta T_{coh}(r)=\alpha E^{vdw}(r)+\beta$ may be $\Delta T_{coh}(r)=118.05+1.6454\,E^{vdw}(r)$.

Figure 2F:
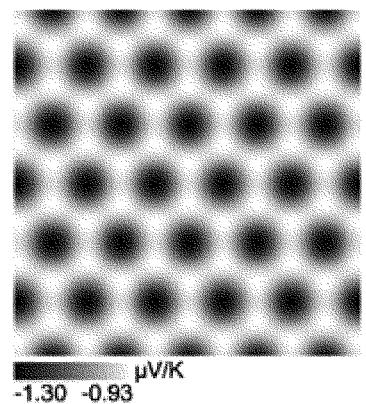

FIG. 2F illustrates a reconstructed image of a theoretical thermoelectric voltage for n-doped free-standing graphene.

FIGS. 2A and 2B illustrate a measured thermoelectric voltage $V^{expt}(r)$ for a defect-free region in bilayer graphene on SiC. FIG. 2C illustrates a theoretical Seebeck coefficient $S^{sample}(r)$ calculated from Equation 7 for the n-doped free-standing graphene. Because a diamond-coated AFM tip and a graphene sample may interact through vdW interaction, the sample Seebeck coefficient $S^{sample}(r)$ may be evaluated at a vdW equilibrium height calculated with a Lennard-Jones potential for pristine graphene, as shown in FIGS. 5A through 5D. The experimental thermoelectric image and theoretical thermopower images in FIGS. 2B and 2C may show a reasonable degree of correspondence in a pattern. In particular, a center void of carbon hexagon may exhibit more negative signals in both experimental and theoretical results than carbon atom sites. Accordingly, an SSM is characteristically different from an STM that picks up more current at charge-abundant atomic sites. However, it may be found from line profiling in FIG. 2D that the sample Seebeck coefficient $S^{sample}(r)$ alone may not reproduce an atomic corrugation observed in the thermoelectric voltage $V^{expt}(r)$.

To identify a role of a temperature at a length scale of coherent transport, Equation 1 may be inverted, and the effective temperature drop $\Delta T_{coh}(r)$ may be deduced. An almost linear correlation between the deduced effective temperature drop $\Delta T_{coh}(r)$ and the vdW energy $E^{vdW}(r)$ may be shown in FIG. 2E. The above linear correlation may exist because the effective temperature drop $\Delta T_{coh}(r)$ may sensitively depend on inter-atomic thermal coupling at the tip-sample interface. In an example of weak thermal coupling on a carbon atom site, a large interfacial temperature drop may be expected. In an example of strong thermal coupling on a central void of carbon hexagon, a small interfacial temperature drop may be expected.

As a result, the deduced effective temperature drop $\Delta T_{coh}(r)$ may exhibit an atomic variation at a sub-angstrom scale from a carbon atom site to a hexagonal void. Therefore, the atomic resolution in the local thermoelectric voltage may be originated from an atomic variation in coherent electron transport via a Seebeck coefficient, and an atomic variation in coherent thermal transport via a thermal conductivity. FIG. 2F illustrates a reconstructed image of a theoretical thermoelectric voltage of pristine free-standing graphene, simulated with the sample Seebeck coefficient $S^{sample}(r)$ and the linear fitting formula of the effective temperature drop $\Delta T_{coh}(r)$.

FIGS. 3A through 3D illustrate images of a thermoelectric voltage for a point defect, a topographic image, and profiles according to an embodiment.

Figure 3A:
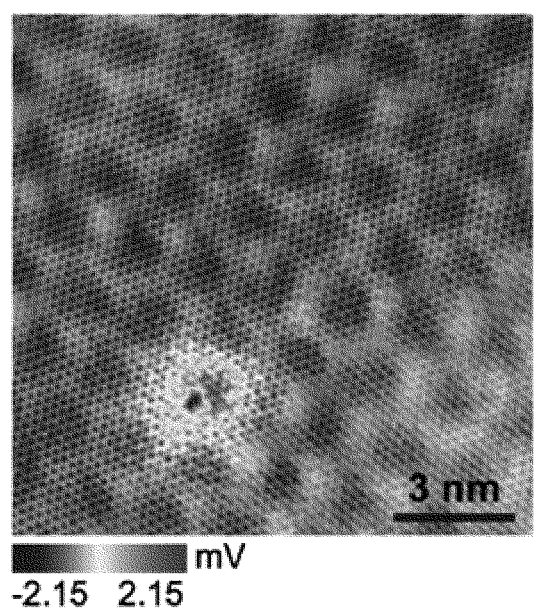
FIGS. 3A through 3D illustrate images of a thermoelectric voltage for a point defect, a topographic image, and profiles according to an embodiment.

FIG. 3A illustrates a large-area scanning image of a thermoelectric voltage for a point defect in bilayer graphene on SiC.

Figure 3B:
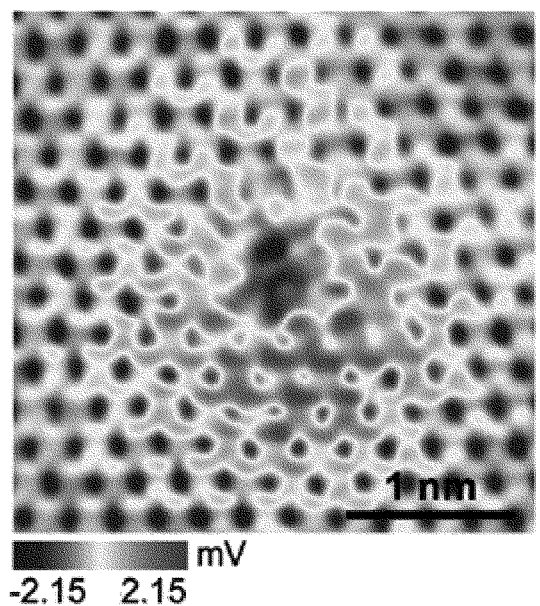
Figure 3C:
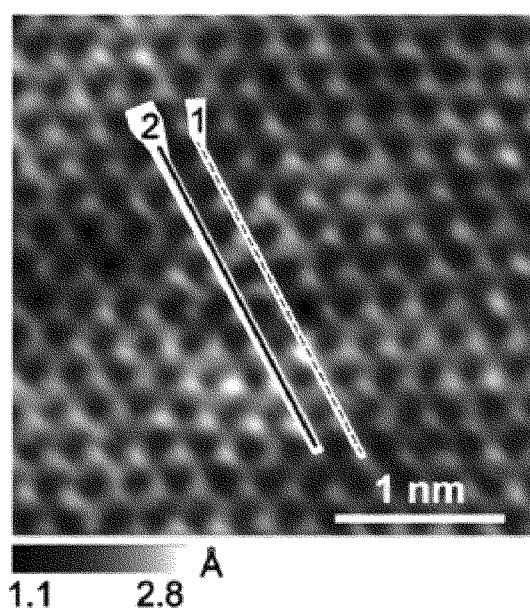

FIG. 3B illustrates a small-area scanning image of a thermoelectric voltage in a rotated view for the point defect in FIG. 3A. FIG. 3C illustrates a topographic image. The small-area scanning image of the thermoelectric voltage, and the topographic image may be simultaneously obtained.

Figure 3D:
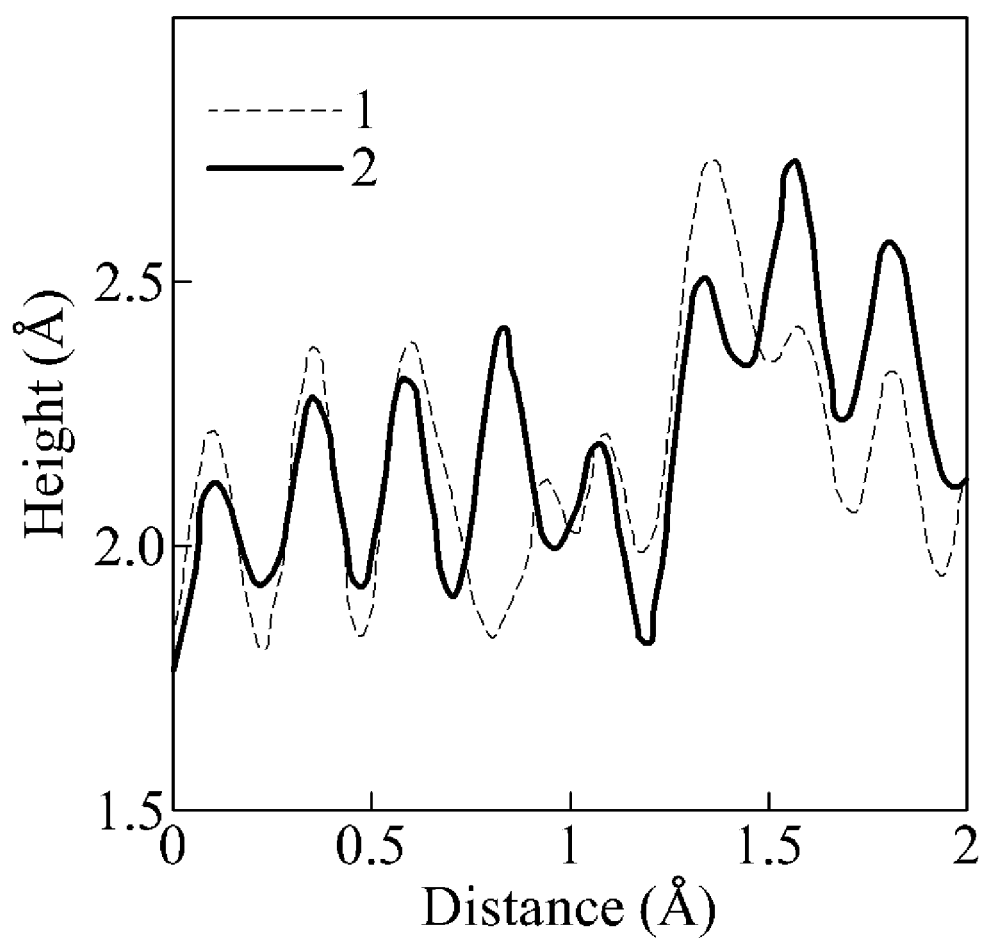

FIG. 3D illustrates height profiles along a dashed line 1 and a bold line 2 of FIG. 3C. In FIG. 3D, comparing the dashed line 1 to the bold line 2, a single carbon atom site may be clearly defective along the dashed line 1.

Based on a linear correlation between the effective temperature drop $\Delta T_{coh}(r)$ and the vdW energy $E^{vdW}(r)$ atomic scale defects on a surface of graphene may be identified by comparing experimental thermoelectric images to simulated thermoelectric voltage images. FIGS. 3A and 3B show thermoelectric images of the point defect in bilayer graphene on SiC. A topographic analysis in FIGS. 3C and 3D may be used to infer that the point defect in an experiment is associated with a single carbon atom site.

FIGS. 4A through 4F illustrate simulated images of Seebeck coefficients and thermoelectric voltages near point defects in n-doped free-standing graphene according to an embodiment.

Figure 4A:
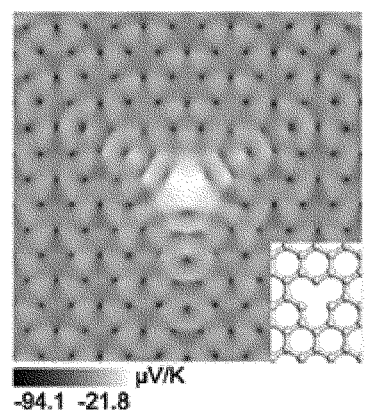
FIGS. 4A through 4F illustrate simulated images of Seebeck coefficients and thermoelectric voltages near point defects in n-doped free-standing graphene according to an embodiment.
Figure 4B:
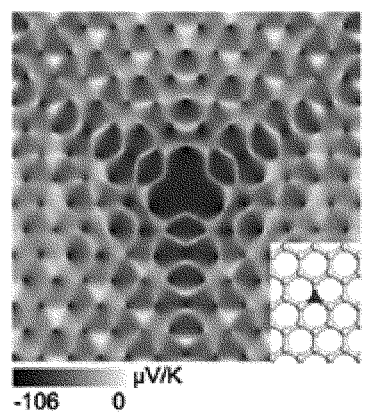
Figure 4C:
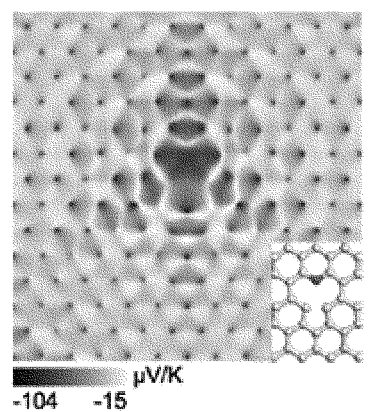
Figure 4D:
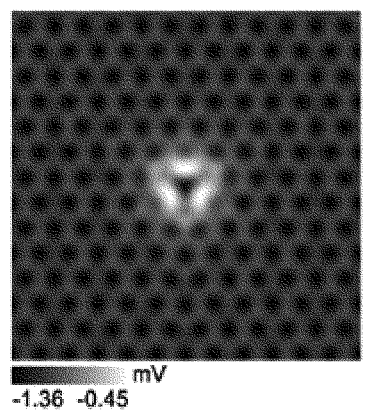

FIGS. 4A and 4D illustrate a simulated image of a Seebeck coefficient and a simulated image of a thermoelectric voltage for a point defect of a single carbon vacancy ($V_C$), respectively.

Figure 4E:
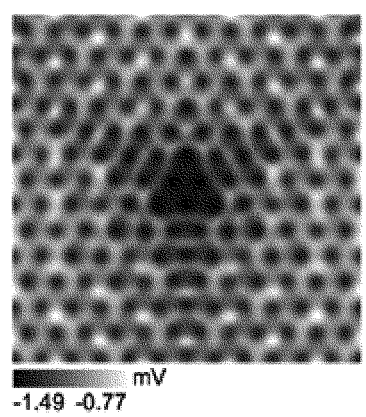

FIGS. 4B and 4E illustrate a simulated image of a Seebeck coefficient and a simulated image of a thermoelectric voltage for a point defect of substitutional nitrogen ($N_C$), respectively.

Figure 4F:
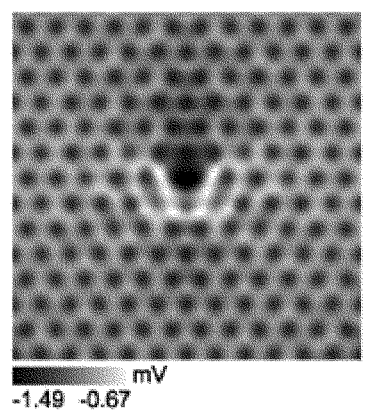

FIGS. 4C and 4F illustrate a simulated image of a Seebeck coefficient and a simulated image of a thermoelectric voltage for a point defect of a defect complex ($V_C$-$O_C$) of a carbon vacancy and substitutional oxygen, respectively.

In FIGS. 4A through 4F, atomic models may be shown in an inset.

To map a defect with an atomic model, a simulation may be performed on thermoelectric images of the $V_C$ of FIGS. 4A and 4D, the $N_C$ of FIGS. 4B and 4E, and the $V_C$-$O_C$ of FIGS. 4E and 4F in the n-doped free-standing graphene.

Because an electron of the $V_C$ defect is located below the Fermi energy as shown in FIG. 7A through 7D, thermopower and thermoelectric images of the $V_C$ defect may have a bright region at a defect site, as opposed to an experimental image. On the other hand, because electrons of the $N_C$ defect and the $V_C$-$O_C$ defect are located above the Fermi energy as shown in FIGS. 8A through 9D, thermopower and thermoelectric images of the $N_C$ defect and the $V_C$-$O_C$ defect may have a dark region, similarly to the experimental image. While the size of the dark region matches well with a size of the $N_C$, a symmetry of the image may match well with an image of the $V_C$-$O_C$. Atomic oxygen may exist during sample growth and formation energy of the $V_C$-$O_C$ may be sufficiently smaller than that of the $V_C$ and accordingly, a point defect in an experiment may be highly likely to be $V_C$-$O_C$. A simulation result including positive signals at $V_{diff}$ of $-0.6$ millivolt (mV) as shown in FIGS. 10A through 10D may reproduce several conspicuous features, compared to an experimental image. Indeed, positive thermoelectric signals near a defect site in the experiment may be associated with fine details of wave function overlap, atom-by-atom thermal coupling, a substrate effect, and diffusive shift $V_{diff}$ that may be limitedly reflected in a current simulation scheme.

Comparing a heat-based scanning thermoelectric microscopy to an STM may be important. Both the above techniques may share common features and functionalities as types of a scanning probe microscopy that provides real-space images of wave functions. The STM may measure a tunneling current by applying a voltage drop across a vacuum-tunneling gap, whereas the heat-based scanning thermoelectric microscopy may measure voltage differences by applying a temperature drop across an interface or across a heat-transfer gap. As a result, Fermi electrons may be only perturbed at the first order by a temperature bias in the heat-based scanning thermoelectric microscopy, in contrast to the zero-order perturbation by a voltage bias in the STM. Accordingly, a scanning thermoelectric microscopy may be useful to differentially analyze Fermi electronic states, even at room temperature, unlike the STM.

Hereinafter, the first-principles calculations will be further described.

A mesoscopic Seebeck coefficient in Equation 7 may be obtained using Kohn-Sham wave functions and a local DOS from first principles density-functional theory calculations of graphene. To calculate a ground-state total-energy, VASP software may be used. A "12×12" graphene supercell may be used for modeling the point defects, that is, the $V_C$, $N_C$, and $V_C$-$O_C$ in graphene. For example, when a Dirac point is set to 0 eV, Fermi energy $E_F$ of 0.3 eV may be used to calculate a local DOS. At an absolute temperature T of 315 K, the sample Seebeck coefficient $S^{sample}(r)$ in Equation 7 may be calculated.

Hereinafter, atomically-varying effective temperature drops will be described.

To deduce an effective temperature drop $\Delta T_{coh}(r)$ from an experimental thermoelectric voltage $V^{expt}(r)$ and a theoretical Seebeck coefficient $S^{sample}(r)$ by inverting Equation 1, a locally-averaged Seebeck coefficient $S^{sample}(r)$ within a specific disk radius R may be used. This is a method based on an effect of a finite size of a probe. In FIGS. 2E and 2F, a locally-averaged Seebeck coefficient $S^{sample}(r)$ with a disk radius R of 0.5 Å may be used. For comparison, an original Seebeck coefficient $S^{sample}(r)$ and a locally-averaged Seebeck coefficient $S^{sample}(r)$ with a disk radius R of 0.3 Å may be used, as shown in FIGS. 6A through 6D.

The deduced effective temperature drop $\Delta T_{coh}(r)$ shows an almost linear correlation or an almost exponential correlation with vdW energy $E^{vdw}(r)$ that is calculated with Lennard-Jones 12-6 potentials, as shown in Equation 8 below.

$$E^{vdW}(r_i) = \sum_j 4\varepsilon_{ij} \left[ \left( \frac{\sigma_{ij}}{|r_i - r_j|} \right)^{12} - \left( \frac{\sigma_{ij}}{|r_i - r_j|} \right)^6 \right] \quad \text{[Equation 8]}$$

In Equation 8, $r_i$ and $r_j$ denote an atomic position of a tip, an atomic position of a sample, respectively, and $\varepsilon$ and $\sigma$ denote Lennard-Jones parameters. The tip may be modeled with a single carbon atom. Parameters $\varepsilon_{ii}$ and $\sigma_{ii}$ for a carbon atom, a nitrogen atom, and an oxygen atom may be listed as shown in Table 1, and $\varepsilon_{ij}=\sqrt{(\varepsilon_{ii}\varepsilon_{jj})}$ and $\sigma_{ij}=(\sigma_{ii}+\sigma_{jj})/2$ may be used. The vdW energy may be summed when an atom-atom distance is less than 15 Å, and an equilibrium height $z(r)$ at minimum vdW energy may be used to evaluate a Seebeck coefficient $S^{sample}(r)$.

TABLE 1

| i | $\varepsilon_{ii}$ (meV) | $\sigma_{ii}$ (Å) |
|---|---|---|
| C | 4.20 | 3.37 |
| N | 7.41 | 3.25 |
| O | 9.12 | 2.96 |

Hereinafter, a statistically defined Fermi temperature will be further described.

In-depth physics of the sample Seebeck coefficient $S^{sample}(r)$ expressed by Equation 7 may be appreciated. The sample Seebeck coefficient $S^{sample}(r)$ may be expressed as shown in Equation 9 below.

$$S^{sample}(r) = -\frac{(k_B \pi)^2 T}{3e} \frac{\partial}{\partial E} (\ln[N_e^{sample}(E, r)])_{E_F} \quad \text{[Equation 9]}$$

When $k_B \ln [N_e^{sample}(E,r)]$ is defined as an electronic entropy, energy derivative of an entropy may correspond to a reciprocal temperature, expressed as shown in Equation 10 below.

$$\frac{1}{T_F(r)} = \frac{\partial}{\partial E} (k_B \ln[N_e^{sample}(E, r)])_{E_F} \quad \text{[Equation 10]}$$

In Equation 10, $T_F(r)$ denotes a position-dependent statistically-defined Fermi temperature. A newly defined Fermi temperature $T_F(r)$ of a real material may be a generalized version of a "Fermi temperature" $T_F=E_F/k_B$ that is only applicable to a three-dimensional (3D) free electron gas model. Additionally, a Seebeck coefficient may be expressed as shown in Equation 11 below.

$$S(r) = -\frac{\pi^2}{3} \frac{k_B}{e} \frac{T}{T_F(r)} \quad \text{[Equation 11]}$$

Equation 11 may be interpreted as a ratio of a thermal equilibrium temperature T and Fermi temperature $T_F$ of a material. A statistically-defined Fermi temperature may be a material property, not a real temperature, and may be either positive or negative depending on a slope of $N_e^{sample}(E,r)$. The Seebeck coefficient in Equation 11 may be conceptually connected to other electron-related thermal characteristics of a material, for example, an electronic heat capacity $c_v = \pi^2 N_e(E_F) k_B^2 T/3$ and a quantum of thermal conductance $g_0 = \pi^2 k_B^2 T/3h$. For example, the Seebeck coefficient and electronic heat capacity may be expressed as shown in Equation 12 below.

$$S(r) = \frac{c_v}{e} \frac{\partial}{\partial E} \left( \frac{1}{N_e^{sample}(E, r)} \right)_{E_F} \quad \text{[Equation 12]}$$

FIGS. 5A through 5D illustrate a model and a DOS of pristine free-standing graphene, vdW energy, and a vdW topography according to an embodiment.

Figure 5A:
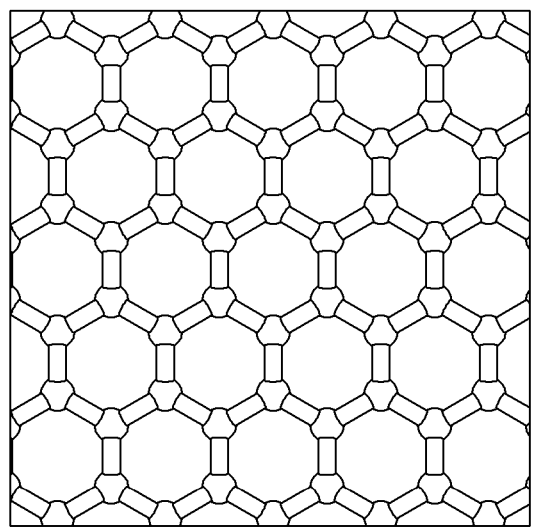
FIGS. 5A through 5D illustrate a model and a density of states (DOS) of pristine free-standing graphene, vdW energy, and a vdW topography according to an embodiment.

FIG. 5A illustrates a ball-and-stick model of the pristine free-standing graphene.

Figure 5B:
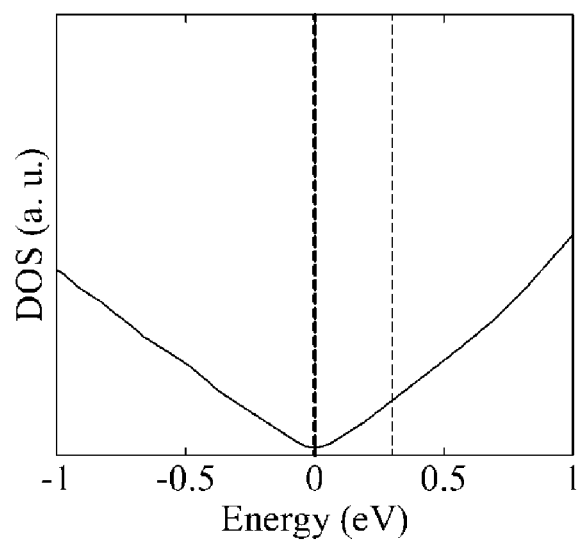

FIG. 5B illustrates the DOS of the pristine free-standing graphene. In FIG. 5B, zero energy may indicate a charge-neutrality point or a Dirac point that is denoted by a bold dashed line. A fine dashed line may mark a Fermi energy of 0.3 eV used for a thermoelectric simulation of FIGS. 4A through 4F.

Figure 5C:
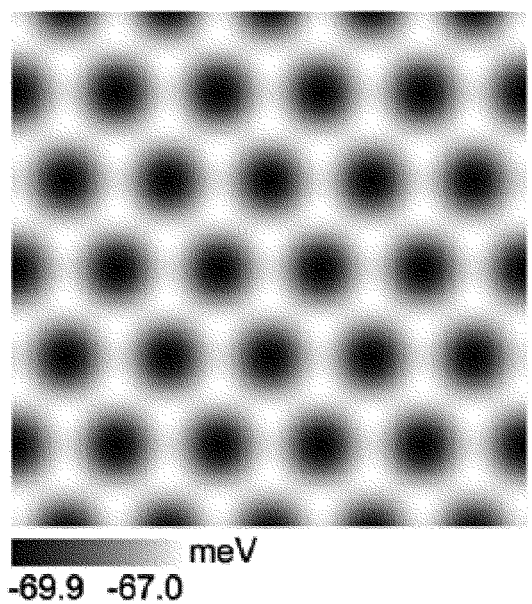

FIG. 5C illustrates a computer-simulated image of vdW energy $E^{vdw}(r)$.

Figure 5D:
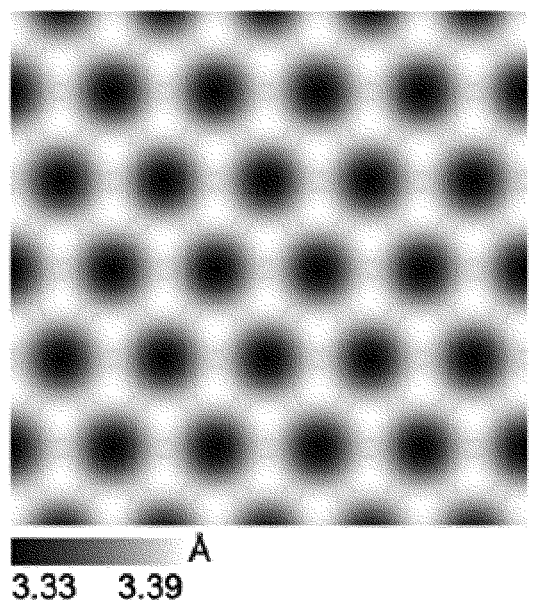

FIG. 5D illustrates a computer-simulated image of vdW topography $z(r)$ at minimum energy.

FIGS. 6A through 6F illustrate locally-averaged Seebeck coefficients, a correlation between vdW energy and an effective temperature drop, and thermoelectric voltages according to an embodiment.

Figure 6A:
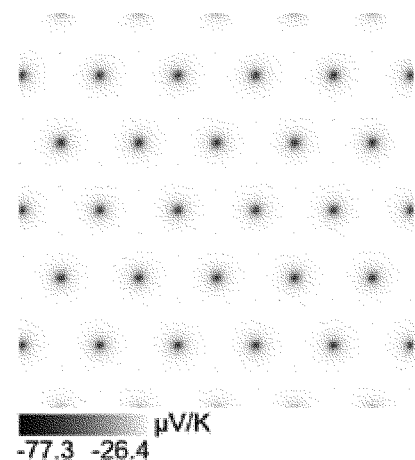
FIGS. 6A through 6F illustrate locally-averaged Seebeck coefficients, a correlation between vdW energy and an effective temperature drop, and thermoelectric voltages according to an embodiment.

FIG. 6A illustrates a computer-simulated image of a locally-averaged Seebeck coefficient within a disk radius R of 0 Å.

Figure 6B:
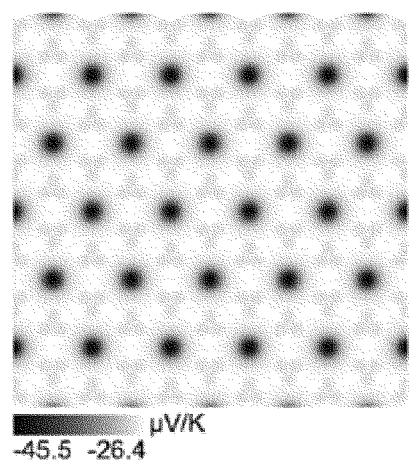

FIG. 6B illustrates a computer-simulated image of a locally-averaged Seebeck coefficient within a disk radius R of 0.3 Å.

Figure 6C:
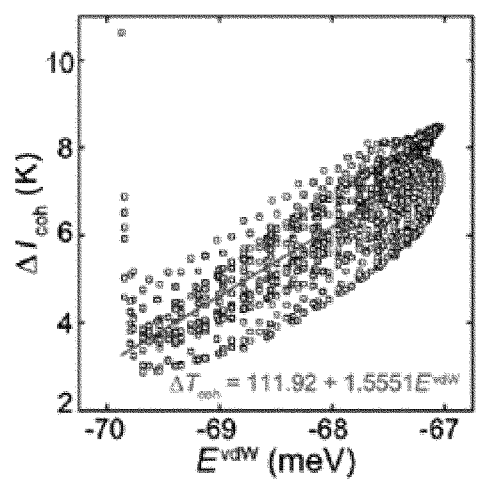

FIG. 6C illustrates a correlation between vdW energy and an effective temperature drop deduced with the disk radius R of 0 Å.

Figure 6D:
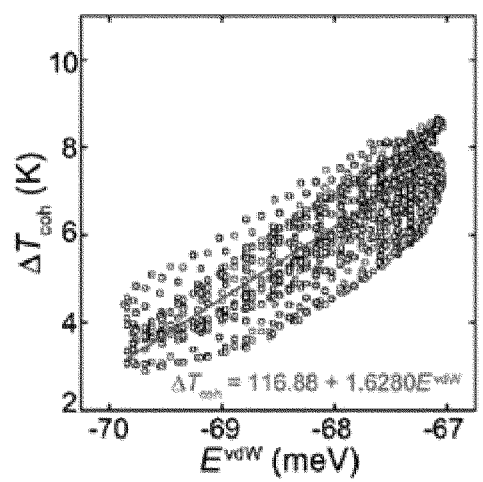

FIG. 6D illustrates a correlation between vdW energy and an effective temperature drop deduced with the disk radius R of 0.3 Å.

Figure 6E:
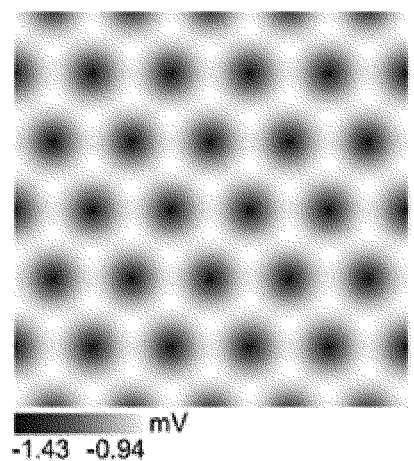

FIG. 6E illustrates a reconstructed image of a thermoelectric voltage for the disk radius R of 0 Å.

Figure 6F:
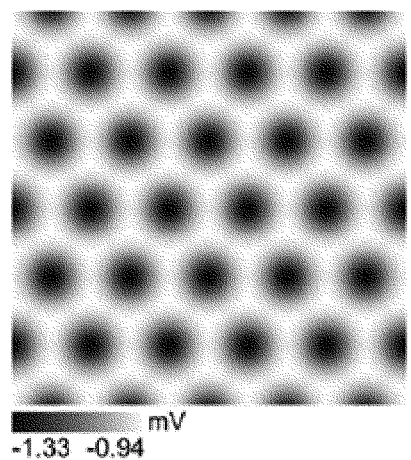

FIG. 6F illustrates a reconstructed image of a thermoelectric voltage for the disk radius R of 0.3 Å.

FIGS. 7A through 7D illustrate a model and a DOS of defective free-standing graphene, vdW energy, and a vdW topography according to an embodiment.

Figure 7A:
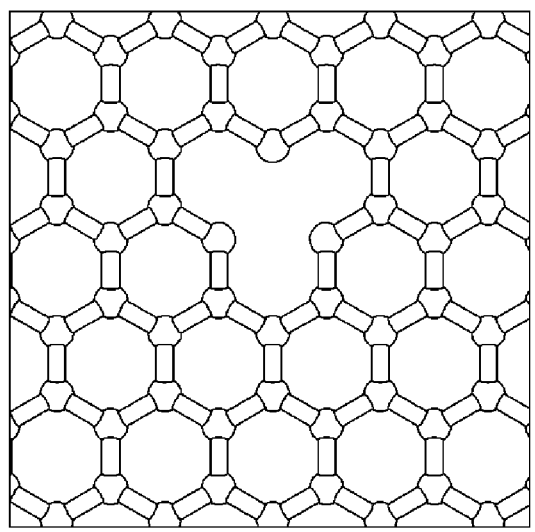
FIGS. 7A through 7D illustrate a model and a DOS of defective free-standing graphene, vdW energy, and a vdW topography according to an embodiment.

FIG. 7A illustrates a ball-and-stick model of defective free-standing graphene with a single $V_C$.

Figure 7B:
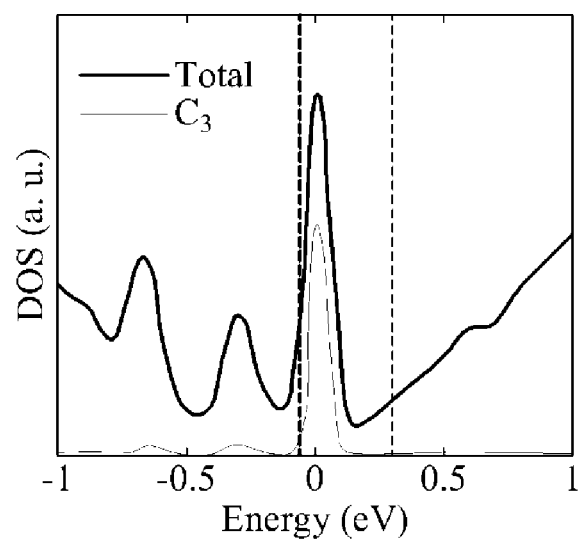

FIG. 7B illustrates a DOS of defective free-standing graphene with a single $V_C$, that is, a local DOS of dangling-bonded carbon $C_3$. In FIG. 7B, zero energy may indicate an original Dirac point, a bold dashed line may indicate original Fermi energy of defective graphene, and a fine dashed line may indicate the elevated Fermi energy of 0.3 eV used for a thermoelectric simulation of FIGS. 4A and 4D.

Figure 7C:
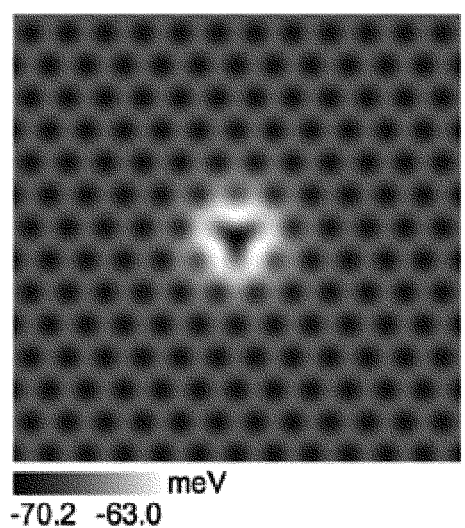

FIG. 7C illustrates a computer-simulated image of vdW energy $E^{vdw}(r)$.

Figure 7D:
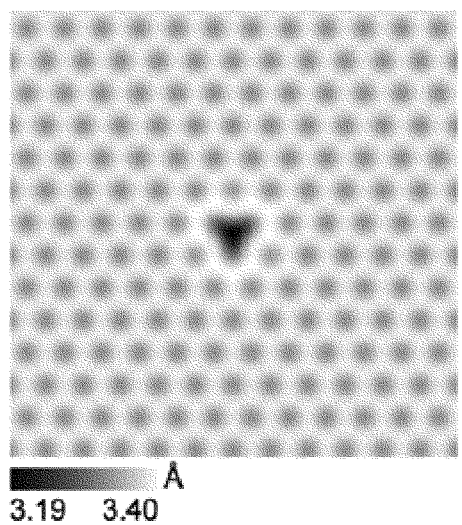

FIG. 7D illustrates a computer-simulated image of a vdW topography z(r) at minimum energy.

FIGS. 8A through 8D illustrate a model and a DOS of defective free-standing graphene with a single $N_C$, vdW energy, and a vdW topography according to an embodiment.

Figure 8A:
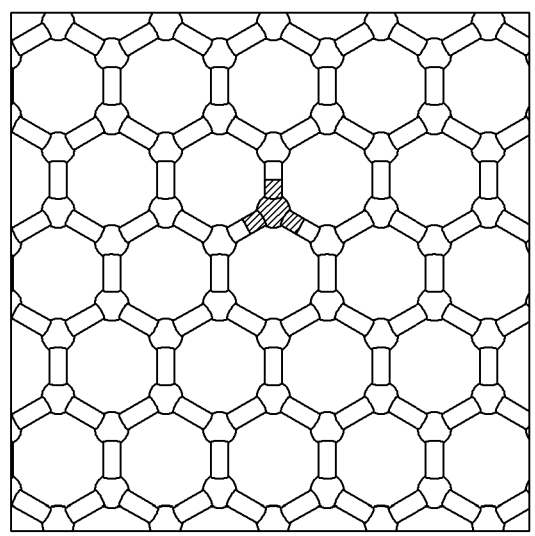
FIGS. 8A through 8D illustrate a model and a DOS of defective free-standing graphene with a single substitutional nitrogen ($N_C$), vdW energy, and a vdW topography according to an embodiment.

FIG. 8A illustrates a ball-and-stick model of defective free-standing graphene with a single $N_C$.

Figure 8B:
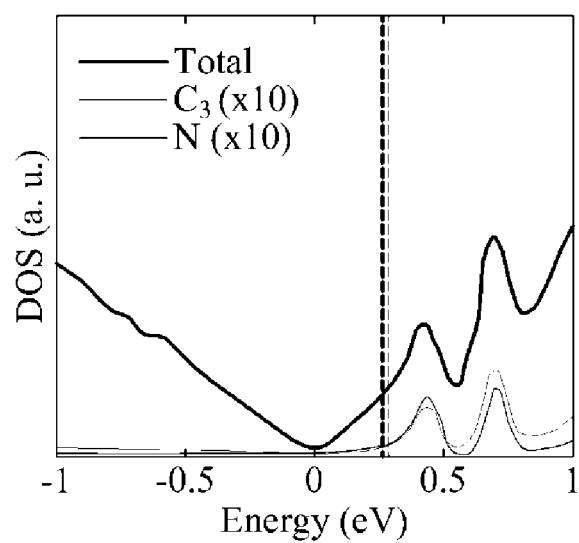

FIG. 8B illustrates a DOS of defective free-standing graphene with a single $N_C$, marked with a medium-thick line. In FIG. 8B, a local DOS for a nitrogen atom and a local DOS of three neighboring carbon atoms may be displayed. In FIG. 8B, Zero energy may indicate an original Dirac point, a bold dashed line may indicate original Fermi energy of defective graphene, and a fine dashed line may indicate Fermi energy of 0.3 eV used for a thermoelectric simulation of FIGS. 4B and 4E.

Figure 8C:
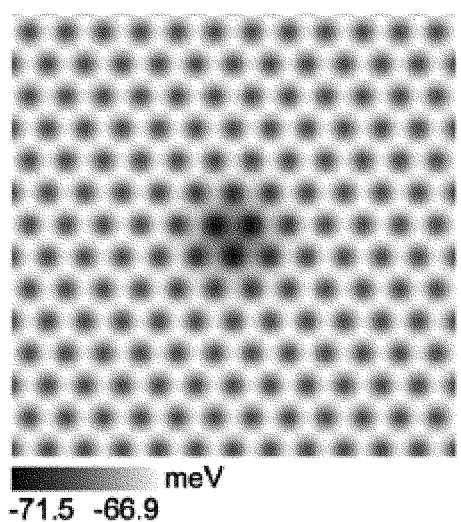

FIG. 8C illustrates a computer-simulated image of vdW energy $E^{vdw}(r)$.

Figure 8D:
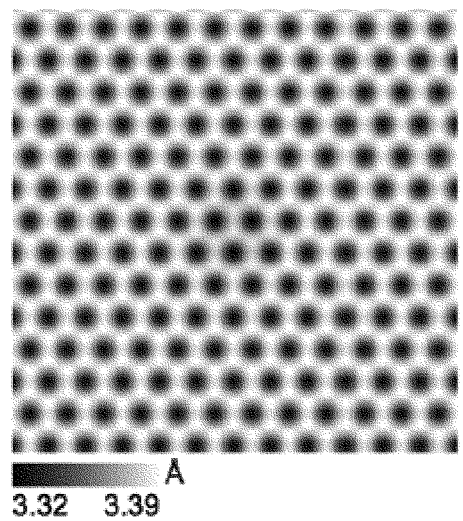

FIG. 8D illustrates a computer-simulated image of a vdW topography z(r) at minimum energy.

FIGS. 9A through 9D illustrate a model and a DOS of defective free-standing graphene with a $V_C$-$O_C$, vdW energy, and a vdW topography according to an embodiment.

Figure 9A:
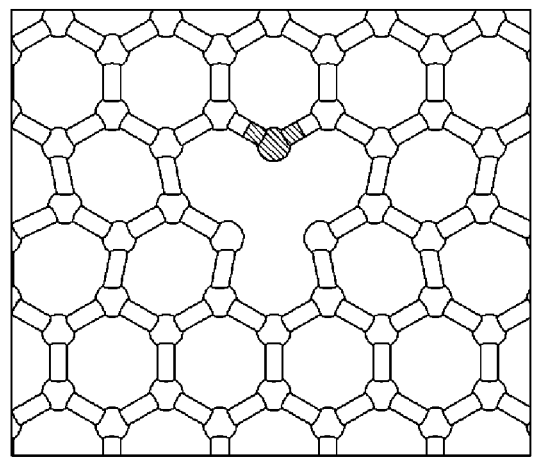
FIGS. 9A through 9D illustrate a model and a DOS of defective free-standing graphene with a defect complex ($V_C$-$O_C$) of a carbon vacancy ($V_C$) and substitutional oxygen ($O_C$), vdW energy, and a vdW topography according to an embodiment.

FIG. 9A illustrates a ball-and-stick model of the defective free-standing graphene with the $V_C$-$O_C$. In FIG. 9A, an oxygen atom may be marked with bold lines.

Figure 9B:
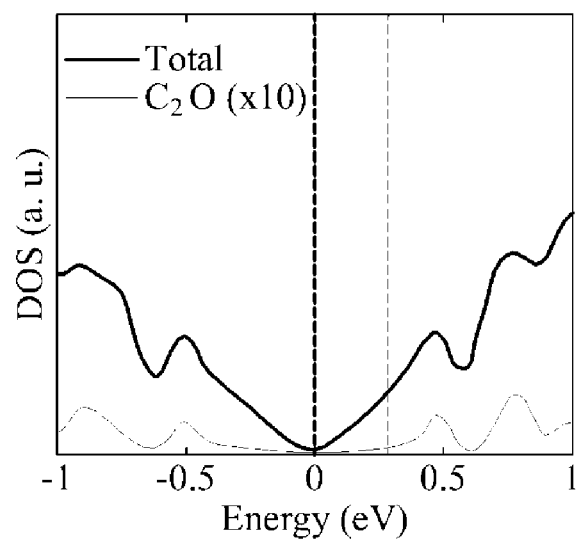

FIG. 9B illustrates a DOS of the defective free-standing graphene with the $V_C$-$O_C$. FIG. 9B may show a local DOS for atoms around a vacancy. In FIG. 9B, zero energy may indicate an original Dirac point, a bold dashed line may indicate original Fermi energy of defective graphene, and a fine dashed line may indicate Fermi energy of 0.3 eV used for a thermoelectric simulation of FIGS. 4C and 4F.

Figure 9C:
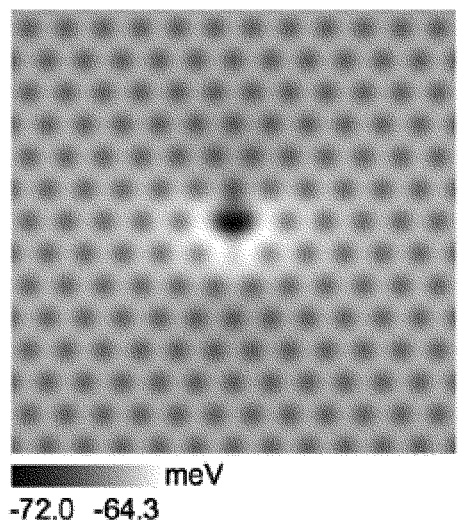

FIG. 9C illustrates a computer-simulated image of vdW energy $E^{vdw}(r)$.

Figure 9D:
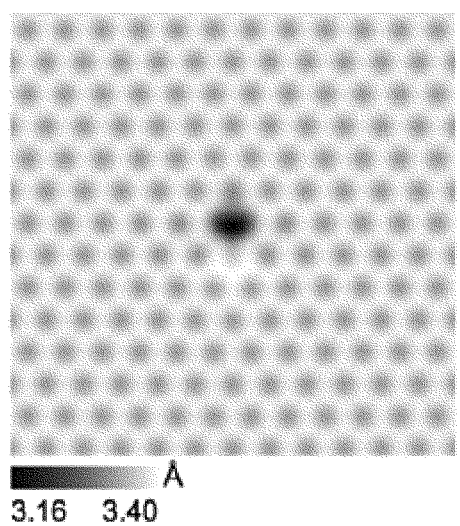

FIG. 9D illustrates a computer-simulated image of a vdW topography z(r) at minimum energy.

FIGS. 10A through 10D illustrate a simulated thermoelectric voltage image for a $V_C$-$O_C$, a fast Fourier transform (FFT) image corresponding to the simulated thermoelectric voltage image, an experimental thermoelectric image, and an FFT image corresponding to the experimental thermoelectric image according to an embodiment.

Figure 10A:
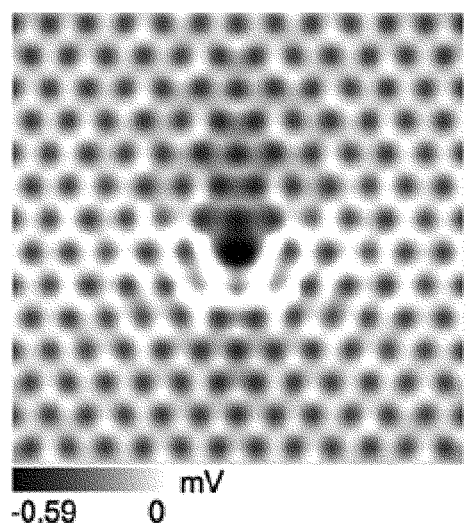
FIGS. 10A through 10D illustrate a simulated thermoelectric voltage image for a $V_C$-$O_C$, a fast Fourier transform (FFT) image corresponding to the simulated thermoelectric voltage image, an experimental thermoelectric image, and an FFT image corresponding to the experimental thermoelectric image according to an embodiment.

FIG. 10A illustrates a computer-simulated image of a thermoelectric voltage for the $V_C$-$O_C$ at $V_{diff}$ of −0.6 mV.

Figure 10B:
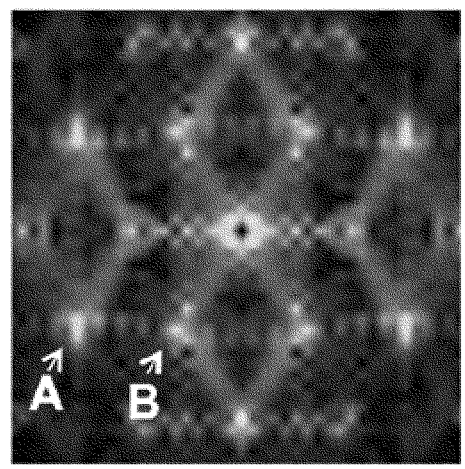

FIG. 10B illustrates an FFT image corresponding to the computer-simulated image of FIG. 10A. In FIG. 10B, an arrow A may correspond to a reciprocal lattice, and an arrow B may be caused by intervalley scattering of a Fermi wave vector $k_F$.

Figure 10C:
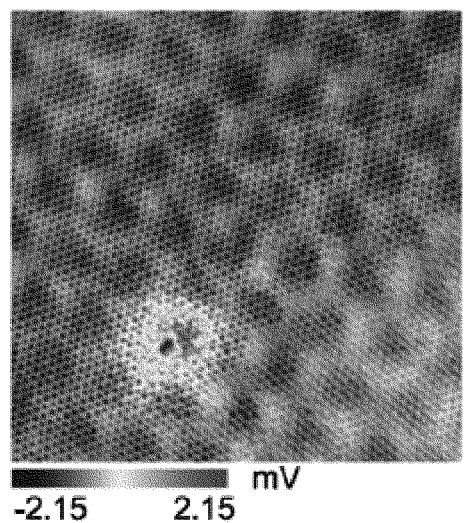

FIG. 10C illustrates an experimental thermoelectric image that may correspond to the large-area scanning image of the thermoelectric voltage of FIG. 3A.

Figure 10D:
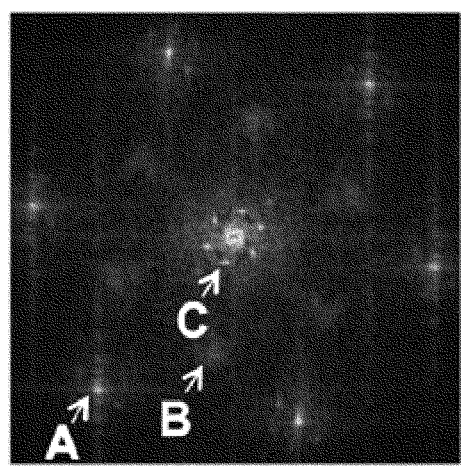

FIG. 10D illustrates an FFT image corresponding to the experimental thermoelectric image of FIG. 10C. In FIG. 10D, an arrow A may correspond to a reciprocal lattice, and an arrow B may be caused by intervalley scattering of a Fermi wave vector $k_F$. Additionally, an arrow C may represent a pattern originated from $6\sqrt{3}\times6\sqrt{3}R30°$ reconstruction of a surface of SiC(0001).

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A computer-aided simulation method for an atomic-resolution scanning Seebeck microscope (SSM) image, wherein a computer calculates a local thermoelectric voltage for a position of a voltage probe in a material surface, to acquire the SSM image corresponding to the position, using the following equation:

$$V(r) = V_{diff} + S_{coh}(r) \int \nabla T(r; r') \cdot \frac{r' - r}{|r' - r|^3} d^3 r'$$

in which V(r) denotes the local thermoelectric voltage, $V_{diff}$ denotes a thermoelectric voltage drop in a diffusive transport region in a tip and a sample, $S_{coh}(r)$ denotes a position-dependent Seebeck coefficient, r denotes a distance measured from a point voltage probe, r' denotes material internal coordinates, $\nabla T(r;r')$ denotes a temperature gradient radially weighted by a factor of $1/r^2$, and $$\int \nabla T(r; r') \cdot \frac{r' - r}{|r' - r|^3} d^3 r'$$

denotes a volume integral of a temperature profile.

2. The computer-aided simulation method of claim 1, wherein the volume integral $$\int \nabla T(r; r') \cdot \frac{r' - r}{|r' - r|^3} d^3 r'$$

is defined by the following equation:

$$\int \nabla T(r; r') \cdot \frac{r' - r}{|r' - r|^3} d^3 r' \equiv \Delta T_{coh}(r)$$

in which $\Delta T_{coh}(r)$ denotes an effective temperature drop at an interface between the tip and the sample.

3. The computer-aided simulation method of claim 2, wherein the effective temperature drop $\Delta T_{coh}(r)$ is calculated by the following equation:

$$\Delta T_{coh}(r) = \frac{\Delta Q \, 3h}{\pi^2 k_B^2 T} \frac{1}{\tau^{ph}(r)}$$

in which $k_B$ denotes a Boltzmann constant, and $\tau^{ph}(r)$ denotes a phonon transmission probability of a tip-sample junction.

4. The computer-aided simulation method of claim 2, wherein the effective temperature drop $\Delta T_{coh}(r)$ is deduced by the following equation:

$$\Delta T_{coh}(r) = \frac{V^{exp}(r) - V_{diff}}{S_{coh}^{theory}(r)}$$

in which $V^{expt}(r)$ denotes an experimental thermoelectric voltage measured in a defect-free region, and $S_{coh}^{theory}(r)$ denotes a theoretical Seebeck coefficient of a material.

5. The computer-aided simulation method of claim 2, wherein the effective temperature drop $\Delta T_{coh}(r)$ is deduced by a function represented by the following equation:

$$\Delta T_{coh}(r) = f(E^{vdw}(r))$$

in which $f(E^{vdw}(r))$ denotes a function comprising a linear fitting formula or an exponential function, and $E^{vdw}(r)$ denotes a van der Waals (vdW) energy, and wherein the function is based on a correlation between the effective temperature drop $\Delta T_{coh}(r)$ and the vdW energy $E^{vdw}(r)$.

6. The computer-aided simulation method of claim 1, wherein the position-dependent Seebeck coefficient $S_{coh}(r)$ is calculated by the following equation:

$$S_{coh}(r) = -\frac{1}{eT} \frac{\int \tau^{el}(E, r)(E - E_F)\left(-\frac{\partial f}{\partial E}\right) dE}{\int \tau^{el}(E, r)\left(-\frac{\partial f}{\partial E}\right) dE}$$

in which e denotes an electron charge, T denotes an absolute temperature, $\tau^{el}$ denotes an electron transmission probability, $E_F$ denotes a Fermi energy, and $f$ denotes a Fermi-Dirac distribution function at the absolute temperature T.

7. The computer-aided simulation method of claim 1, wherein the position-dependent Seebeck coefficient $S_{coh}(r)$ is derived from the Landauer formula to the following equation:

$$S_{coh}(r) = S^{tip} + S^{sample}(r)$$

in which denotes a $S^{tip}$ Seebeck coefficient, and $S^{sample}(r)$ denotes a sample Seebeck coefficient of a material.

8. The computer-aided simulation method of claim 7, wherein the sample Seebeck coefficient $S^{sample}(r)$ defined by the following equation:

$$S^{sample}(r) = -\frac{1}{eT} \frac{\int N_e^{sample}(E, r)(E - E_F)\left(-\frac{\partial f}{\partial E}\right) dE}{\int N_e^{sample}(E, r)\left(-\frac{\partial f}{\partial E}\right) dE}$$

in which e denotes an electron charge, T denotes an absolute temperature, $E_F$ denotes a Fermi energy, $f$ denotes a Fermi-Dirac distribution function at the absolute temperature T, and $N_e^{sample}(E,r)$ denotes a local density of states (DOS) obtained from first-principles calculations for a material surface.

\* \* \* \* \*